Aug. 9, 1927.
G. B. KINSLER
1,638,400
UNIVERSAL JOINT
Filed May 6, 1926
2 Sheets-Sheet 1
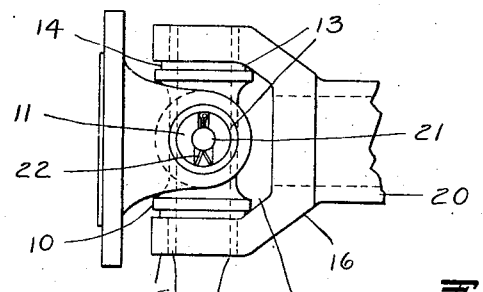
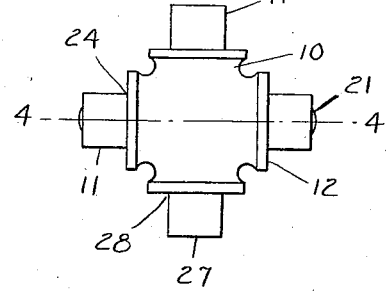
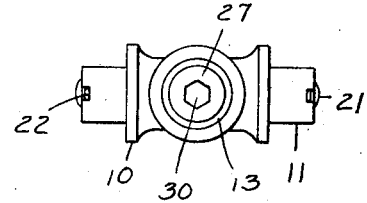
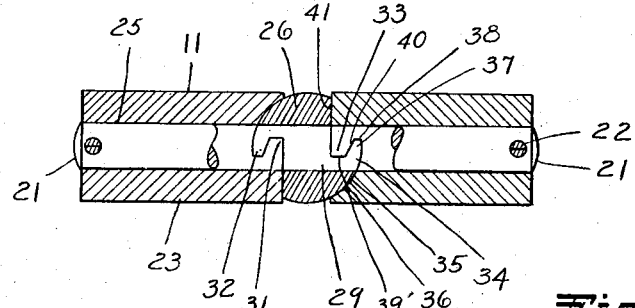
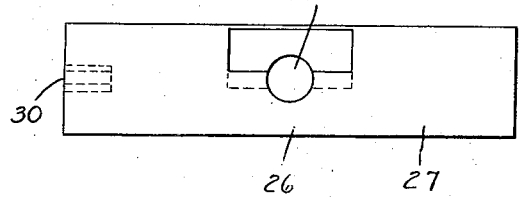
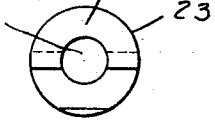
Inventor:
George B. Kinsler
Louis M. Schmidt
Atty.

Aug. 9, 1927.
G. B. KINSLER
1,638,400
UNIVERSAL JOINT
Filed May 6, 1926
2 Sheets-Sheet 2
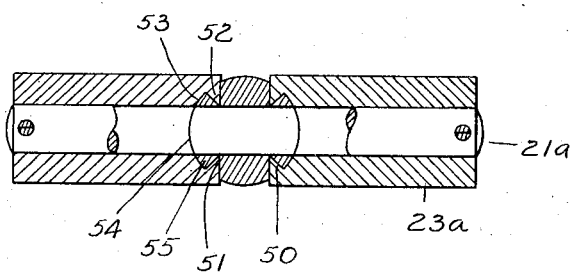
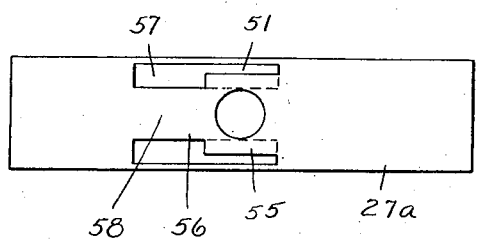
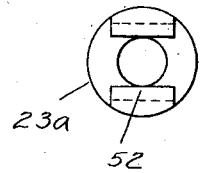
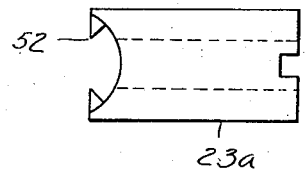
Inventor:
George B. Kinsler
Louis M. Schmidt
Atty.

Patented Aug. 9, 1927.

1,638,400

UNITED STATES PATENT OFFICE.

GEORGE B. KINSLER, OF HARTFORD, CONNECTICUT, ASSIGNOR OF ONE-THIRD TO ARTHUR J. BRODEUR, OF WEST HARTFORD, CONNECTICUT.

UNIVERSAL JOINT.

Application filed May 6, 1926. Serial No. 107,091.

My invention relates to improvements in universal joints of the usual form as to the general operative features and the object of my improvement is to produce a universal joint in which the bearing pins are removably secured in position in a central housing or body; the pins along one axis being made of separate or individual parts that engage by their inner ends with the intermediate pin structure; the opposed parts having interengaging locking members, and; in which a longitudinally disposed pin serves as means for holding said locking members in the inter-engaged position.

In the accompanying drawing:—

Figure 1 is a side elevation of a universal joint embodying my invention, parts of the two yoke structures being also shown.

Figure 2 is an end face view of the bearing pin member shown in Fig. 1.

Figure 3 is a plan view of the same, showing the wrench receiving socket in one end of the long bearing pin member.

Figure 4 is a sectional view on the line 4—4 of Fig. 2 and on an enlarged scale.

Figure 5 is a side elevation of the long bearing pin member.

Figure 6 is an end elevation of one of the short bearing pin members.

Figure 7 is a sectional view corresponding to Fig. 4 showing a modified form of structure.

Figure 8 is a side elevation of the long bearing pin member shown in Fig. 7.

Figure 9 is an end view of one of the short pins.

Figure 10 is a side view of the same.

My improved universal joint comprises a central housing or body 10 from which project in substantially the usual manner a set of bearing pins that are arranged in pairs along common axes, all of the axes being in a common plane, and the axis of one pair being at right angles to the axis of the other pair, said pins 11 being individually in the form of short stub-shafts.

The body 10 has a set of radial faces 12 from which the pins 11 project outwardly and against which are seated the bearing bushings 13 that serve as the bearings proper in cooperation with the bearing pins 11.

As shown, the inner end portion 14 of the bearing bushings 13 are in the form of flanged structures that are interposed between the faces 12 mentioned and the opposed faces of the arms 15 of the yoke 16. Thus the structures of the yokes 16 serve to hold the bearing bushings in place.

The sleeve-like body portion 17 of the bearing bushing 13 in each case fits over the bearing pin 11 and is received within the opening 18 in the yoke arm 15, being entered into position from the inner space 19, between the arms 15, before the bearing pins are assembled with the body 10.

So far as the operative features are concerned under conditions of use the four bearing pins 11 may be substantially alike and the structures of the arms 15 of the two yokes 16 are alike. As to other details of the yokes 16, as shown in Fig. 1, one may terminate in the form of a tubular extension 20 for connection with a rod or the like, at the right in said figure, and the other may merge with a flange structure for connection with a companion flange.

An exterior view of the assembled body 10 and bearing pins 11 shows at the ends of one pair of pins 11 the ends of a locking pin 21. Also, there may be one or more cotter-pins 22 that lock the locking pin 21 in place against longitudinal displacement.

The bearing pins 11 mentioned in which are disclosed the ends of the locking rod 21 are each a part of a short pin member 23 and which extend inwardly along suitable bores 24 of the body 10 and that at their inner ends interlock with the interposed middle portion 26 of the long pin member 27. Said long pin member 27 extends through a bore 28 in the body 10 in the form of a single piece or shaft that terminates by its ends to provide the pair of bearing pins 11 that are individually solid.

The long pin member 27 is perforated at the middle by an opening 29 that is in registration with the longitudinal bores 25 in the short pin members 23 and through which the locking pin 21 passes when in the locking position.

The long pin member 27 is provided with means for forceful rotation and to this end may have at one end, as shown, a hexagonal-walled socket 30 for receiving a suitable wrench.

The inter-engaging means for the pin members comprises the following:—

On the opposite sides of the middle portion 26 of the long pin member 27 is a recess or socket 31 that is bordered on the outside by a projection or tooth 32 that cooperates with a tooth 33 on the opposed end portion of the short pin member 23. With the teeth 32 and 33 engaged and the locking pin 21 in place the pin members 23 and 27 that carry the bearing pins 11 are positively locked in place in the body 10.

In disengaging the parts the cotter-pins 22 are removed, the locking pin 21 is slipped out of the way, and finally the actual disengagement is effected by turning the long pin member 27, as by means of a wrench applied to the socket 30, the parts being constructed and arranged to respond to such manipulation.

As to details, back of the tooth 33 on the end of the short pin member 23 is a cut-away portion or recess 34. The rear wall 35 of this last named recess 34 is opposed to and fits against the periphery 36 of the middle portion 26 of the long pin member 27 and the one is seated against the other as closely contacting members, the opposed faces being of cylindrical form.

The cylindrical rear wall 35 terminates at the inner end back of the tooth 33 and at a point 37 slightly beyond the axis. The portion of the recess 34 outward from the point 37 and which is the portion that is immediately inward from the tooth 33 is shaped precisely to fit the tooth 32 and to this end, as shown, comprises a short longitudinally directed wall or face 38 that corresponds to the flat top face of the tooth 32. A second longitudinally directed wall or face 39 defines the flat top face of the tooth 33. An inclined wall or face 40 connects the longitudinally directed faces 38 and 39 and defines the engaging faces of the teeth 32 and 33.

The end face 41 of the tooth 33, which corresponds to the inner end face of the short pin member 23, is flat and radial.

As described, the details of the teeth and recesses are such that the teeth fit closely one against the other and the teeth substantially fill the portions of the cut-away portions or recesses in which they are housed.

That is to say, at each joint or junction there are cooperating holding parts on the two members and which may be designated for each member as a projection, ridge, or tooth and back of each holding part is a cut-away or reduced part which may be described as being provided in the form of a recess or socket. The holding part of one member will be housed in the socket back of the holding part of the mating member; as is well understood in situations involving the inter-engagement of teeth or the like. It will be noted, however, in the present instance, as shown, that in each case the holding part on one member fits within and substantially fills the socket in which it is entered. To this end, also as shown, the boundary or border walls of the one correspond to those of the other.

In the modification shown in Figs. 7, 8, and 9 the long pin member 27ª and the two short pin members 23ª are connected by means of a dove-tail structure 50 consisting of a pair of grooves or ways 51 on each side of the long pin member and a lug 52 on each of the short pin members.

The grooves 51 define what in cross-section appears to be a fan-shaped head 53, as is common in dove-tail connections generally, and the lugs 52 are separated by a receiving space or socket 54 that fits said head 53.

The parts are locked in position by means of the locking pin 21ª that extends longitudinally along the short pin members 23ª and directly through the middle of the long pin member 27ª, substantially as described in regard to the form that is shown in Figs. 1 to 6 inclusive.

The teeth or lugs 52 are admitted to the engaging position, back of the opposed cooperating overhanging portions 55 of the fan-shaped head 53 by a lateral movement from an entrance portion 56 and in which the overhanging portions 55 are omitted.

The entrance portion 56 comprises a pair of spaced recesses 57 that are virtually extensions of the grooves or ways 51 and they are separated in pairs by the intermediate ridge 58. Said ridge 58 merges with the head 53.

In both forms of structure the members are locked in position by means of a locking pin.

It will be particularly noted that in the structure described that in the assembled position the short pins are engaged with the middle portion of the long pin in a manner for preventing longitudinal separation. That is to say, to prevent pulling the short pins away from the long pin. Also, that this result is attained by reason of the interengaging teeth or lugs and that the function of the locking pin is merely to hold these teeth or lugs in the inter-engaged position. As the pins are separated by a forceful rotation of the long bearing pin, the locking pin merely operates to prevent such rotation. It is for this reason that a cotter-pin, as shown and described, suffices to hold the locking pin in the locking position.

I claim as my invention:—

1. In a universal joint structure, a body having intersecting bores, bearing pin structures housed in said bores and projecting by their ends from said body, said pin structures comprising one long pin extending across the intersection of said bores and a pair of short pins that are opposed by their inner ends to said long pin, said inner ends and long pin being provided with interlocking means for preventing disconnection in the form of inter-engaging teeth, and means for locking said pins in the engaged position.

2. In a universal joint structure as described in claim 1, said last named means comprising a pin that extends longitudinally along said short pins and across said long pin.

3. In a universal joint, a body having intersecting bores, bearing pins housed in said bores and comprising a long pin in one bore and extending across the other bore and a pair of short pins housed individually in the other bore and with the ends opposed to said long pin, said ends being individually notched at one side to provide a tooth at the extreme end, and said long pin being recessed at the sides for receiving said teeth.

4. In a universal joint structure as described in claim 1, a locking pin serving as means for locking said pins in the engaged position, and a cotter-pin serving as means for holding said locking pin in the locking position.

5. In a universal joint as described in claim 3, the parts being constructed and arranged so that the engagement of the short pins with the long pin is effected by a rotative movement of the long pin.

6. In a joint for connecting the side of one pin with the end of another pin, said side being recessed to provide a tooth-like ridge, said end being recessed adjacent the extreme end to provide a tooth at said extreme end, and said tooth in the connecting position fitting in and substantially filling the recess adjacent said tooth-like ridge.

7. In a universal joint structure, a body having intersecting bores and a set of pins housed in said bores and comprising a long pin and a pair of short pins that are opposed individually by one end to the side of said long pin, said pins having tooth-like interlocking means for preventing disconnection, a rod-like structure, housed in bores in said pins, serving as means holding said pins in such interlocked position, and a cotter-pin serving as means for retaining said rod-like structure in such holding position.

8. In a universal joint, a body having intersecting bores, a set of pins housed in said bores and comprising a long pin and a pair of short pins that are opposed individually by one end to the side of said long pin, said pins having tooth-like interlocking means for preventing disconnection, and the parts being constructed and arranged so that the engagement and disengagement of said pins is effected by a rotative movement of the long pin.

GEORGE B. KINSLER.